(12) United States Patent  (10) Patent No.: US 7,957,705 B1
Oh  (45) Date of Patent: Jun. 7, 2011

(54) SYSTEM AND METHOD FOR REDUCING RADIO FREQUENCY INTERFERENCE CAUSED BY A CARRIER

(75) Inventor: Daesik Oh, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 693 days.

(21) Appl. No.: 12/050,800

(22) Filed: Mar. 18, 2008

(51) Int. Cl.
*H04B 1/04* (2006.01)
*H04K 3/00* (2006.01)

(52) U.S. Cl. .................. 455/104; 455/127.3; 455/511

(58) Field of Classification Search .............. 455/102, 455/103, 104, 127.3, 511; 370/342, 343
See application file for complete search history.

(56) References Cited

U.S. PATENT DOCUMENTS

| | | | |
|---|---|---|---|
| 5,920,550 A | 7/1999 | Willey | |
| 6,078,571 A | 6/2000 | Hall | |
| 6,756,844 B2 | 6/2004 | Nanao et al. | |
| 7,035,587 B1 | 4/2006 | Yarkosky | |
| 2004/0137947 A1 | 7/2004 | Nimmo-Smith | |
| 2004/0214608 A1 | 10/2004 | Mostafa et al. | |
| 2007/0110097 A1* | 5/2007 | Hsieh | 370/464 |
| 2008/0200138 A1* | 8/2008 | Sipila | 455/226.2 |
| 2009/0059822 A1 | 3/2009 | Morrill et al. | |

OTHER PUBLICATIONS

U.S. Appl. No. 11/486,750, entitled, "Reverse Link Transmit Power Control in a Wireless Communication System," filed Jul. 14, 2006.
U.S. Appl. No. 11/182,521, entitled, "Reconfigurable Transmitter," filed Jul. 15, 2005.
U.S. Appl. No. 10/501,095, entitled, "Base Station for a Telecommunication System," filed Jan. 31, 2003.
U.S. Appl. No. 11/157,766, entitled, "Apparatus for Removing Distortions Created by an Amplifier," filed Jun. 21, 2005.
U.S. Appl. No. 10/290,187, entitled, "Method of Optimizing the Efficiency of an Amplifier for Amplifying a Plurality of Modulated Carriers Simultaneously," filed Nov. 8, 2002.
U.S. Appl. No. 11/854,511, entitled, "Call-Detection Algorithm for Mitigating Interference by Low-Cost Internet-Base-Station (LCIB) Pilot Beacons with Macro-Network Communications," filed on Sep. 12, 2007.
U.S. Appl. No. 11/874,846, entitled "Alternate Operational-Data Transmission Scheme for Low-Cost-Internet-Base-Station-(LCIB) Systems," filed on Oct. 18, 2007.
U.S. Appl. No. 11/945,964, entitled "Mobile-Station-Assisted Low-Cost-Internet-Base-Station-(LCIB) Location Determination," filed on Nov. 27, 2007.

(Continued)

*Primary Examiner* — Lee Nguyen (57) ABSTRACT

A base station (BS) and method to reduce RF interference by a carrier. The BS includes a first power amplifier (PA) that emits a first carrier, a second PA that emits a second carrier, a processor, and data storage containing program instructions. The BS is operable in a first state in which the first PA is on and the second PA is off and a second state in which the first and second PAs are on. Execution of the instructions while the BS operates in the first state cause the processor to determine that the BS receives a mobile station communication and cause the BS to operate in the second state, and while the BS operates in the second state, cause the processor to determine that no mobile stations are registered as being authorized to be served by the BS and cause the BS to operate in the first state.

21 Claims, 5 Drawing Sheets

OTHER PUBLICATIONS

U.S. Appl. No. 11/954,072, entitled "Initially Determining the Location of a Low-Cost Internet Base Station (LCIB) by Receiving and Using Macro-Base-Station-Identifying Data," filed on Dec. 11, 2007.

U.S. Appl. No. 11/854,504, entitled "Mitigating Interference by Low-Cost Internet-Base-Station (LCIB) Pilot Beacons with Macro-Network Communications," filed on Sep. 12, 2007.

U.S. Appl. No. 11/940,159, entitled "Low-Cost-Internet-Base-Station-(LCIB) User Adaptation Algorithm," filed on Nov. 14, 2007.

U.S. Appl. No. 11/951,140, entitled, "Alternative Timing Source for Low-Cost-Internet-Base-Station-(LCIB) Systems," filed on Dec. 5, 2007.

U.S. Appl. No. 11/960,987, entitled "Mobile-Station and Macro-Network-Aided Location Determination of a Low-Cost Internet Base Station (LCIB)," filed on Dec. 20, 2007.

U.S. Appl. No. 11/874,811, entitled, "Prioritizing Carriers in Low-Cost Internet-Base-Station-(LCIB) Frequency-Hopping Pilot Beacons," filed on Oct. 18, 2007.

U.S. Appl. No. 11/781,829, entitled "Multi-Carrier Capacity Increase in Low-Cost Internet Base Station (LCIB) Systems by Logical grouping of Base Stations," filed on Jul. 23, 2007.

Mpirical, Pilot Beacon, download from the World Wide Web, http://www.mpirical.com/companion/mpirical_companion.html#http://www.mpirical.com/companion/Generic/Pilot_Beacon.htm, on Mar. 12, 2008.

Skyworks, Inc., Base Station Treansmitter with Combining Amplifier, download from the World Wide web, http://www.skyworksinc.com/sky_blocks/BS_Transmitter.pdf, on Mar. 12, 2008.

Dr. Ernest Simo, CDMA Tech Talk, The Pilot Channels, 2.0 The Forward Pilot Channels, downloaded from the World Wide Web at http://www.cdmaonline.com/members/techtalk/vol14/vol4slide03.htm, on Jan. 18, 2008.

NASDAQ News, Skyworks introduces femto cell colutions at Samsung, Compound Semiconductor Blog, Jan. 9, 2008.

Skyworks, SKY65113-84LF: Linear Power Amplifier Driver, 1.0 W 400-2300 MHz, Preliminary Data Sheet, Dec. 19, 2006.

Skyworks, SKY65028-70LF: 450 MHz-1.5 GHz Linear power Amplifier Driver, Data Sheet, Jul. 31, 2006.

Nokia Siemens Netorks, Nokia Siemens Networks Striding toward an open market with 3G Femto Home Access Solution, 2007.

Kamran Etemad, CDMA2000 Evolution, System Concepts and Design Principles, 2004, pp. 29-64.

* cited by examiner

SYSTEM AND METHOD FOR REDUCING RADIO FREQUENCY INTERFERENCE CAUSED BY A CARRIER

BACKGROUND

1. Cellular Wireless Networks and Macro Base Stations

Many people use mobile stations, such as cell phones and personal digital assistants (PDAs), to communicate with cellular wireless networks. These mobile stations and networks typically communicate with each other over a radio frequency (RF) air interface according to a wireless protocol such as Code Division Multiple Access (CDMA), perhaps in conformance with one or more industry specifications such as IS-2000. Wireless networks that operate according to the IS-2000 specification are often referred to as "1xRTT networks," which stands for "Single Carrier Radio Transmission Technology networks." Another protocol that may be used is known as Evolution Data Optimized (Ev-DO), perhaps in conformance with one or more industry specifications such as IS-856, Release 0 and IS-856, Revision A. Other protocols may be used as well, such as Global System for Mobile Communications (GSM), Time Division Multiple Access (TDMA), and/or any others.

These networks typically provide services such as voice, Short Message Service (SMS) messaging, and packet-data communication, among others, and typically include a plurality of base stations, each of which provide one or more coverage areas, such as cells and sectors (i.e., individual areas of a cell that allow the cell to carry more calls). When a mobile station is positioned in one of these coverage areas, it can communicate over the air interface with the base station, and in turn over one or more circuit-switched and/or packet-switched signaling and/or transport networks to which the base station provides access.

The base stations for these networks are typically not associated with any particular subscriber or subscribers, but rather are placed in publicly-accessible locations and are used by the service provider's subscribers generally. These base stations collectively blanket cities, rural areas, etc. with coverage; as such, they are referred to generally and herein as "macro base stations," and the network they collectively form—or to which they collectively belong—is referred to generally and herein as the "macro-network."

Mobile stations and macro base stations may conduct communication sessions (e.g. voice calls and data sessions) over a pair of frequencies known as carriers, with the base station transmitting to the mobile station on one of the frequencies, and the mobile station transmitting to the base station on the other. This is known as frequency division duplex (FDD). The base-station-to-mobile-station link is known as the forward link, while the mobile-station-to-base-station link is known as the reverse link.

Furthermore, using a sector as an example of a coverage area, macro base stations may provide service in a given sector on one carrier, or on more than one. An instance of a particular carrier in a particular sector is referred to herein as a sector/carrier. In a typical CDMA system, using a configuration known as radio configuration 3 (RC3), a macro base station can, on a given sector/carrier, transmit forward-link data on a maximum of 64 distinct channels at any time, each corresponding to a unique 64-bit code known as a Walsh code. Of these channels, typically, 61 of them are available as traffic channels (for user data), while the other 3 are reserved for administrative channels known as the pilot, paging, and sync channels.

When a macro base station instructs a mobile station assigned to a given sector/carrier to use a particular traffic channel for a communication session, the macro base station does so by instructing the mobile station to tune to one of the 61 traffic channels on that sector/carrier. It is over that assigned traffic channel that the macro base station will transmit forward-link data to the mobile station during the ensuing communication session. And, in addition to that forward-link channel, the traffic channel also includes a corresponding Walsh-coded reverse-link channel, over which the mobile station will transmit data to the macro base station.

2. Femtocell Base Stations

Many macro-network subscribers, including private consumers and small businesses, among others, in addition to having wireless service (which may include data service) for their mobile station(s), also have high-speed (a.k.a. "broadband") Internet access through another communication channel. This other channel may be cable-modem service, digital-subscriber-line (DSL) service, satellite-based Internet service, and/or some other option.

In an exemplary arrangement, a user may have a cable modem connected (a) via coaxial cable to the cable provider's network and (b) via Ethernet cable to a wireless (e.g. IEEE 802.11 (WiFi)) router. That router may include one or more Ethernet ports to which computers or other devices may be connected, and may also include wireless-access-point functionality, providing a WiFi packet-data interface to laptop computers, digital video recorders (DVRs), appliances, and/or any other computing devices or their wireless network adapters.

To address gaps in macro-network coverage (e.g. poor in-building coverage) and for other reasons, macro-network service providers have recently begun offering consumers devices referred to herein as femtocell base stations, which may also be referred to as femtocells (femto base stations, femto base transceiver stations (BTSs)), picocells (pico base stations, pico BTSs), ubicells, microcells (micro base stations, micro BTSs), and perhaps by other names.

A typical femtocell base station may be approximately the size of a desktop phone or WiFi access point, and is essentially a low-power, low-capacity, low-cost version of a macro base station. Thus, a typical femtocell base station will use a normal power outlet perhaps with a transformer providing a DC power supply. The normal power outlet may provide electrical service at approximately 120 VAC and 60 Hz. The femtocell base station may have a wired (e.g. Ethernet) or wireless (e.g. WiFi) connection with the user's router, and would thus have connectivity to the Internet and/or one or more other packet-data networks via the user's broadband connection. A femtocell base station may establish a virtual-private-network (VPN) connection over the Internet with an entity (e.g. a VPN terminator) on the wireless-service provider's core network, and thereby be able to securely communicate with the VPN terminator and other entities on that core network and beyond.

The femtocell base station also has a wireless-communication (e.g. CDMA) interface that is compatible with the user's mobile station(s), such that the femtocell base station may provide coverage on the wireless-service provider's network via the user's Internet connection. Usually, a femtocell base station will provide service on a single RF carrier (or on a single carrier per technology, where multiple technologies (i.e. CDMA, EV-DO) are supported), and also transmit what is known as a pilot beacon that mobile stations can use to establish/continue a communication session via the femtocell base station. And femtocell base stations typically include a Global Positioning System (GPS) receiver for use in receiving and decoding GPS signals, for use in determination of location, as well as for use in synchronizing operations with other femtocell base stations and with the macro-network, based on timing information embedded in GPS signals. Typically, femtocell base stations have fairly comprehensive auto-configuration capabilities, such that they are largely "plug-and-play" to the user.

OVERVIEW

Exemplary systems and methods for reducing radio frequency (RF) interference caused by a carrier emitted by a device, such as a base station of a wireless communication system, are described herein. Reducing the RF interference may, for example, result from turning the carrier off and/or from turning off a power amplifier within the device. Reducing the RF interference may improve communications occurring via the same carrier emitted by another device and/or via one or more other carriers.

In one respect, an exemplary embodiment arranged as a method may be carried out by a base station that includes a first power amplifier to emit a first carrier for carrying a pilot beacon and a second power amplifier to emit a second carrier for carrying forward-link communications. The base station is operable in a first state in which the first power amplifier is turned on and the second power amplifier is turned off, and the base station is operable in a second state in which the first power amplifier is turned on and the second power amplifier is turned on. The exemplary method includes, at the base station, (i) while the base station is operating in the first state, making a first determination that the base station receives a communication from a given mobile station, and in response to making the first determination, transitioning the base station to operate in the second state instead of the first state, and (ii) while the base station is operating in the second state, making a second determination that no mobile stations are registered as being authorized to be served by the base station, and in response to making the second determination, transitioning the base station to operate in the first state instead of the second state. In accordance with this and other exemplary embodiments, the received communication may comprise an access probe sent by the given mobile station via a reverse-link access channel or some other type of communication.

In another respect, an exemplary embodiment may be arranged as a system including a first power amplifier to emit a first carrier for carrying a pilot beacon, and a second power amplifier to emit a second carrier for carrying forward-link communications. The system is operable in a first state in which the first power amplifier is turned on and the second power amplifier is turned off, and in a second state in which both the first power amplifier and the second power amplifier are turned on. In accordance with this exemplary system, the first power amplifier does not emit the second carrier and the second power amplifier does not emit the first carrier.

The system also includes a processor, data storage that contains computer-readable program instructions executable by the processor, and a communication interface to carry out communications with one or more mobile stations. Execution of the program instructions cause the processor (i) while the system operates in the first state, to make a first determination that the communication interface receives a communication from a given mobile station, (ii) in response to making the first determination, to transition the system to operate in the second state instead of the first state, (iii) while the base station operates in the second state, to make a second determination that no mobile stations are registered as being authorized to be served by the system, and (iv) in response to making the second determination, to transition the system to operate in the first state instead of the second state.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

BRIEF DESCRIPTION OF THE DRAWINGS

Exemplary embodiments arranged as a system or method are described herein with reference to the drawings, in which.

DETAILED DESCRIPTION

1. Introduction

A given macro base station may emit one or more carriers so as to provide a wireless service coverage area. For purposes of this description, a given carrier emitted by the given macro base station will be referred to as the "given macro base station carrier."

One or more other base stations (e.g., one or more femtocell base stations) may be located within or near the coverage area provided by the given macro base station. The one or more femtocell base stations may each emit one or more carriers to carry forward-link communications via one or more traffic channels and/or a pilot beacon. In some cases, the frequency of the carrier(s) emitted by the femtocell base station(s) may differ from the frequency of the given macro cell base station carrier. However, in other cases, the frequency of the carrier(s) emitted by the femtocell base station(s) may be the same as the frequency of the given macro base station carrier.

The carrier(s) emitted by the femtocell base station(s) may cause interference with the given macro base station carrier. The interference may reduce the quality of communications provided by the given macro base station. The interference may be intensified in the cases in which the frequency of the carrier(s) emitted by the femtocell base station(s) is/are the same as the frequency of the given macro base station carrier.

Each base station may include a power amplifier for emitting a carrier at an appropriate power level. The appropriate power level may be fixed so that a carrier emitted by the base station is emitted at a fixed power level. A first carrier that carries pilot beacons may be emitted at a fixed power level. Alternatively, the appropriate power level may be varied so that a carrier emit by the base station is emitted at various power levels. A second carrier that carries forward-link communications via traffic channels may be emitted at various power levels. Some base stations may include multiple power amplifiers that emit respective carriers and/or a power amplifier that emits multiple carriers. This latter power amplifier is referred to herein as a multicarrier power amplifier (MPA).

In accordance with an exemplary system and method described herein, a base station (e.g., a femtocell base station) may operate in (i) a first state in which a power amplifier of the base station is turned off, and (ii) a second state in which the power amplifier of the base station is turned on. RF interference caused by a carrier emitted from this power amplifier may be reduced by causing the base station to operate in the first state. The base station preferably operates in the first state when no mobile stations authorized to be served by the base station are registered with the base station.

An exemplary method may be carried out by a base station including a first power amplifier that emits a first carrier for carrying pilot beacons and a second power amplifier that emits a second carrier for carrying forward-link communications. The base station is operable in a first state in which the first power amplifier is turned on and the second power amplifier is turned off, and in a second state in which the first power amplifier and the second power amplifier are both turned on. The exemplary method includes: (i) while the base station is operating in the first state, making a first determination that the base station receives a communication from a given mobile station, and in response to making the first determination, transitioning the base station to operate in the second state instead of the first state, and (ii) while the base station is operating in the second state, making a second determination that no mobile stations are registered as being authorized to be served by the base station, and in response to making the second determination, transitioning the base station to operate in the first state instead of the second state.

2. Exemplary Architecture

Figure 1:
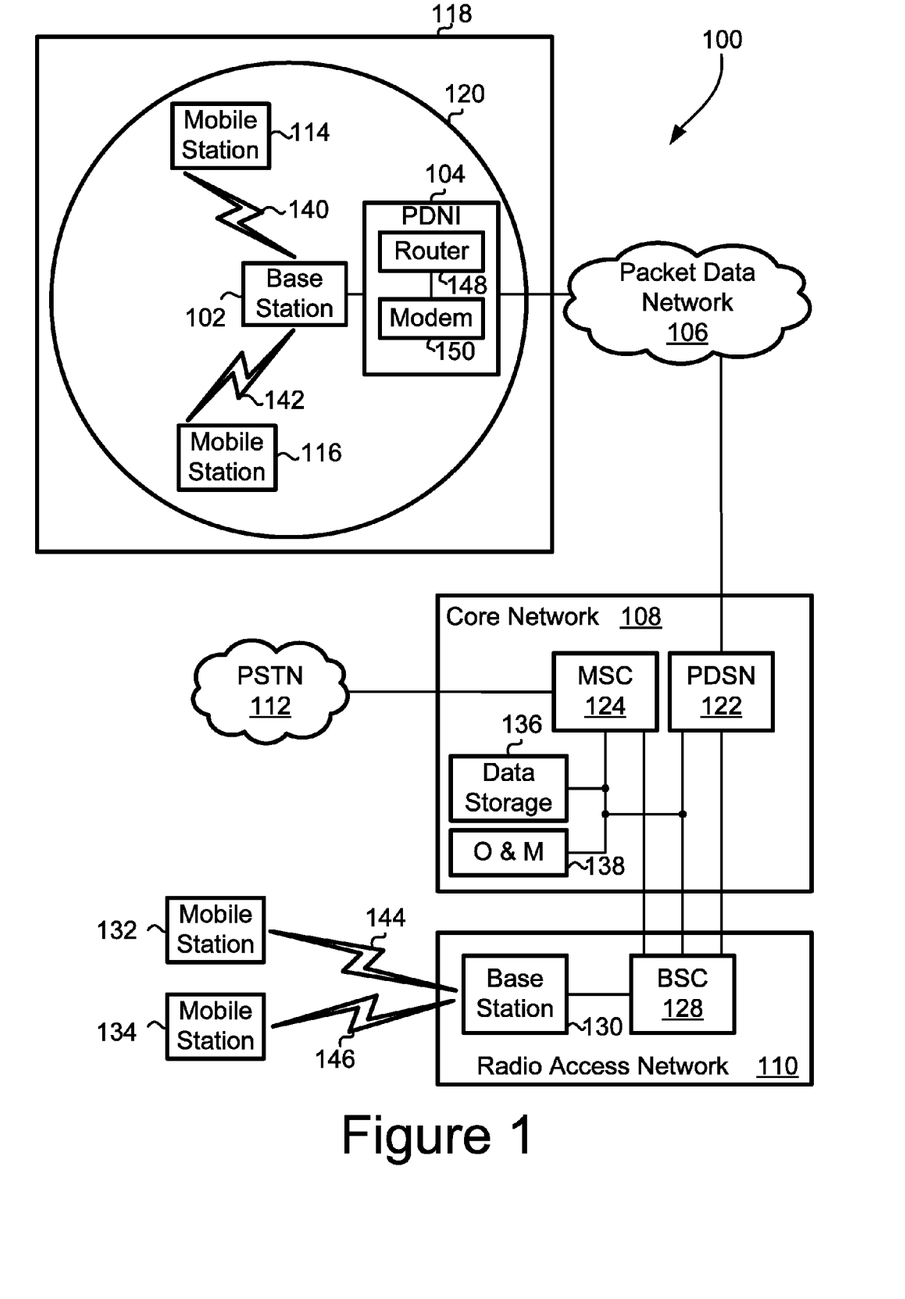
FIG. 1 is a block diagram of a system in which an exemplary embodiment may be implemented.

FIG. 1 depicts a system 100 in which exemplary embodiments may be carried out. It should be understood, however, that this and other arrangements described herein are provided for purposes of example only. As such, those skilled in the art will appreciate that other arrangements and other elements (e.g. machines, interfaces, functions, orders, and groupings of functions, etc.) can be used instead, and some elements may be omitted altogether. Further, many of the elements described herein are functional entities that may be implemented as discrete or distributed components or in conjunction with other components, in any suitable combination and location, and as any suitable combination of hardware, firmware, and/or software. Additionally or alternatively, a computer-readable medium may contain program instructions, executable by a processor, to cause functions described herein to be performed.

As illustrated in FIG. 1, system 100 includes a base station 102, a packet data network interface (PDNI) 104, a packet data network 106, a core network 108, a radio access network (RAN) 110, a public switched telephone network (PSTN) 112, and mobile stations 114, 116, 132, 134. Base station 102 and PDNI 104 may be located indoors within a customer premises 118, such as a house, a hospital, or an office building. Alternatively, base station 102 and/or PDNI 104 may be located outdoors. Core network 108 and/or RAN 110 may be operated and maintained by a wireless service provider. PSTN 112 may include and provide connectivity to various landline communication devices such as, but not limited to, a landline telephone and a landline facsimile machine.

Base station 102, which may be a femtocell base station or another type of base station, emits one or more carriers so as to form a wireless service coverage area 120. In an embodiment in which base station 102 is located within customer premises 118, coverage area 120 may be contained within, or substantially within, customer premises 118. By way of example, coverage area 120 is illustrated as being circular. However, the actual shape of coverage area 120 may be non-circular and may change over time.

PDNI 104 may include a router 148 and a modem 150, such as a cable modem, a digital subscriber line (DSL) modem, or some other type of modem. Router 148 may communicate with modem 150, base station 102, and one or more other components (e.g., a desktop computer and/or a DVR) located within customer premises 118. Modem 150 may (i) modulate a carrier with data packets destined for transmission via packet data network 106, and (ii) demodulate a carrier, transmitted via packet data network 106, so as to obtain data packets destined for base station 102 or another component that communicates with router 148. Modem 150 may provide the data packets obtained from the carrier to router 148, and router 148 may then provide the data packets to base station 102 and/or to another component that communicates with router 148. The data packets provided to base station 102 may contain data for a Voice over Internet Protocol (VoIP) data session, an SMS message, or some other communication session.

Packet data network 106 may include one or more wireless communication links and/or one or more wired communications links. These communication links, which may include the Internet, may carry out communications using a protocol such as Ethernet, Internet Protocol (IP), user datagram protocol (UDP), asynchronous transfer mode (ATM), frame relay, X.25, multiprotocol label switching (MPLS), CMDA (e.g., 1xRTT, 1xEV-DO), iDEN, TDMA, AMPS, GSM, UMTS, EDGE, WiMaX (e.g., IEEE 802.16), LTE, microwave, satellite, MMDS, Wi-Fi (e.g., IEEE 802.11), Bluetooth, infrared, or some other protocol.

Core network 108 includes a packet data serving node (PDSN) 122, a mobile switching center (MSC) 124, data storage 136, and an operations and maintenance (O & M) section 138. PDSN 122 operates as a gateway between packet data network 106 and core network 108 and performs various functions such as establishing, maintaining, and terminating point-to-point protocol (PPP) communication sessions. MSC 124 is a switch for communications sessions occurring over both RAN 110 and PSTN 112. Data storage 136 contains various types of data, such as data for a home location register (HLR) accessible by MSC 124 and BSC 128, and/or data that may be provided to a base station and useable by that base station to determine whether a given mobile station is authorized to use that base station. O & M section 138 provides means for the wireless service provider to operate and maintain core network 108 and/or RAN 110. O & M section 138 may include a user interface that allows the wireless service provider to input data some or all of the data contained in data storage 136.

For simplicity of FIG. 1, RAN 110 is depicted as only including a base station controller (BSC) 128 and a base station 130. However, RAN 110 may include one or more other base stations, each of which may be controlled by BSC 128 or by another BSC within RAN 110. Additionally, core network 108, packet data network 106, PDNI 104, and base station 102 may extend RAN 110 so as to provide or improve wireless service in an area (e.g., coverage area 120) in which the RAN 110 otherwise provides no or poor wireless service.

In this regard, base station 102 may be considered as a base station of RAN 110.

RAN 110 provides means for one or more mobile stations (e.g., one or more of mobile stations 114, 116, 132, 134) to carry out communication sessions with another communication device, such as a communication device connected to PSTN 112 or another mobile station. BSC 128 is operable to handoff communications sessions from one base station to another base station. For example, BSC 128 may hand off a communication session from base station 130 to base station 102 or from base station 102 to base station 130.

Mobile stations 114, 116, 132, 134 may be arranged as any of a variety of communication devices, such as a wireless telephone, a personal digital assistant (PDA), or some other device. Mobile stations 114, 116 may be transported outside of coverage area 120, outside of customer premises 118, and into a wireless service coverage area provided by base station 130 or another base station. Mobile stations 132, 134 may be transported into and out of coverage area 120 and into and out of a coverage area provide by base station 130 or another base station. One of ordinary skill in the art will understand that one or more other mobile stations and/or one or more fixed communication devices, such as a desktop computer or a wireless local loop hub, may be included within system 100 so as to carry out communication sessions via a base station of system 100.

Communications between a mobile station and a base station may occur via an air interface. For example, communications between mobile station 114 and base station 102 may occur via air interface 140, which includes one or more carriers emitted by base station 102 in the forward-link direction and one or more carriers emitted by mobile station 114 in the reverse link direction. As another example, communications between mobile station 116 and base station 102 may occur via air interface 142, which may include the one or more carriers emitted by base station 102 in the forward-link direction and one or more carriers emitted by mobile station 116 in the reverse link direction. Likewise, communications between mobile stations 132, 134 and base station 130 may occur via air interfaces 144, 146, respectively.

Figure 2:
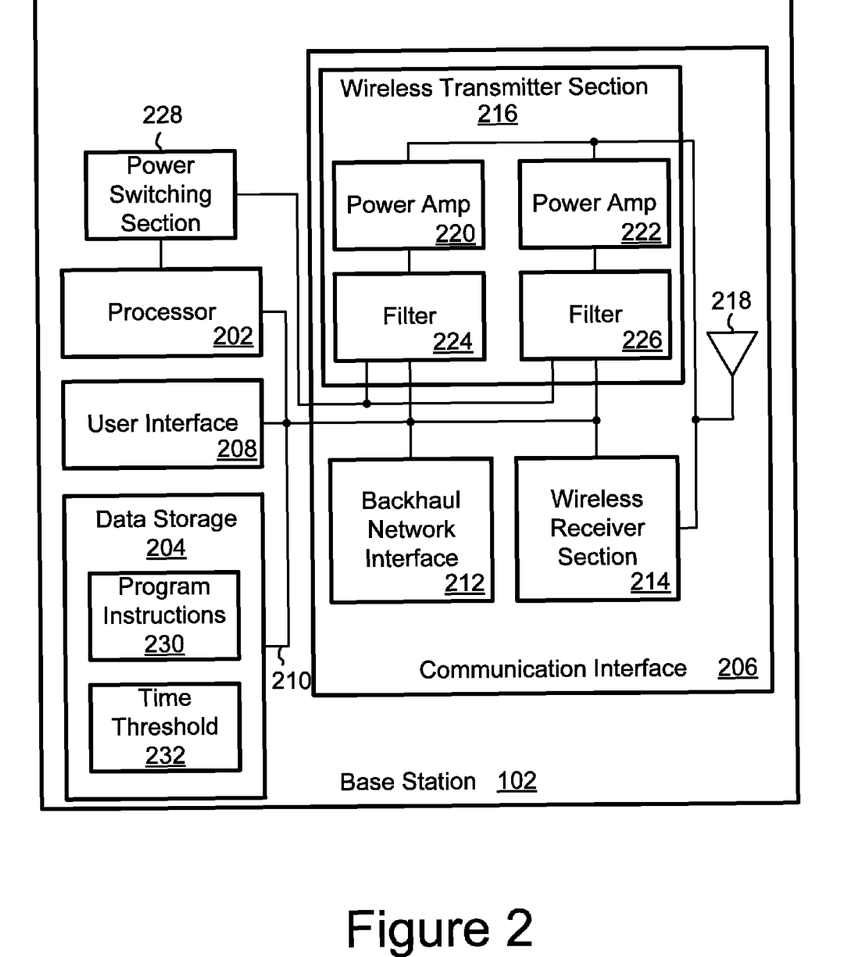
FIG. 2 is a block diagram of an exemplary base station.

FIG. 2 is a block diagram of base station 102. As illustrated in FIG. 2, base station 102 includes a processor 202, data storage 204, a communication interface 206, and a user interface 208, all of which may be linked together via a system bus, network, or other connection mechanism 210. Base station 102 also includes a power switching section 228.

Processor 202 may comprise one or more general purpose processors (e.g., INTEL microprocessors) and/or one or more special purpose processors (e.g., digital signal processors). Processor 202 may execute computer-readable program instructions stored in data storage 204.

Data storage 204 comprises a computer-readable storage medium readable by processor 202. The computer-readable storage medium may comprise volatile and/or non-volatile storage components, such as optical, magnetic, organic or other memory or disc storage, which can be integrated in whole or in part with processor 202.

Communication interface 206 may comprise: (i) a backhaul network interface 212, (ii) a wireless receiver section 214, which may be referred to as a wireless receiver, (iii) a wireless transmitter section 216, which may be referred to as a wireless transmitter, and (iv) an antenna 218. Antenna 218 may comprise one or more antennas, such as an antenna connected to wireless receiver 214 and an antenna connected to wireless transmitter 216.

Communication interface 206 is operable to carry out communications with one or more mobile stations (e.g., mobile stations 114, 116) via wireless receiver section 214 and/or wireless transmitter section 216. The communications between communication interface 206 and a mobile station may include forward-link communications sent to the mobile station from communication interface 206 and/or reverse-link communications sent to communication interface 206 from the mobile station.

Wireless receiver section 214 is operable to receive reverse-link communications sent from one or more mobile stations over an air interface (e.g., air interfaces 140, 142). Wireless receiver section 214 provides the received reverse-link communications to backhaul network interface 212 for subsequent transmission of the received communications, for example, to core network 108 via PDNI 104 and packet data network 106 or to RAN 110 via PDNI 104, packet data network 106, and core network 108.

Wireless transmitter section 216 includes power amplifiers 220, 222 and input filters 224, 226. Power amplifier 220, when turned on, may emit a first carrier that carries data/signals within a variety of forward-link channels such as pilot channel, a sync channel, and/or a paging channel. Preferably, however, the first carrier does not transmit any data/signals within a traffic channel.

The data/signals transmitted within a pilot channel may include pilot beacons. Each pilot beacon may comprise a stream of zeros that is spread by a Walsh code of 0 and then multiplied by a pseudorandom (PN) offset to identify the base station that emits the carrier that carries the pilot beacon. A pilot beacon transmitted via the first carrier may be received and used by a mobile station to determine whether handoff to base station 102 or handoff from base station 102 should occur.

Power amplifier 222, when turned on, may emit a second carrier that carries data/signals within a variety of channels, such as a pilot channel, a sync channel, a paging channel, a traffic channel and/or some other type of channel. The second carrier carries the data/signals in a forward-link direction. In accordance with the wireless transmitter section configuration illustrated in FIG. 2, power amplifier 220 does not emit the second carrier and power amplifier 222 does not emit the first carrier.

Turning on or off a power amplifier, such as power amplifier 220, may be carried out in various ways. For example, processor 202 may execute program instructions that cause power switching section 228 to (i) close a switch so as to connect power amplifier 220 to a power source that provides an electrical current to amplifier 220 so as turn on amplifier 220, and thereafter (ii) open the switch so as to prevent amplifier 220 from receiving the electrical current from the power source so as to turn amplifier 220 off. Processor 202 may execute similar program instructions to turn power amplifier 222 on and off. Other examples of turning a power amplifier on and off are also possible.

Input filter 224 is connected to power amplifier 220. Input filter 224 may receive a first input signal from processor 202 or from another element of base station 102. The first input signal may include the first carrier and the second carrier. Input filter 224 may pass the first carrier and filter out the second carrier so as to produce a first filtered input signal that includes the first carrier and that excludes (e.g., substantially excludes) the second carrier. The first filtered input signal may be provided to power amplifier 220. Power amplifier 220 may amplify the first filtered input signal so as to produce the first carrier that is emitted from power amplifier 220.

Input filter 226 is connected to power amplifier 222. Input filter 226 may receive a second input signal from processor 202 or from another element of base station 102. The second input signal may include the first carrier and the second carrier. Input filter 226 may pass the second carrier and filter out the first carrier so as to produce a second filtered input signal that includes the second carrier and that excludes (e.g., substantially excludes) the first carrier. The second filtered input signal may be provided to power amplifier 222. Amplifier 222 may amplify the second filtered input signal so as to produce the second carrier that is emitted from amplifier 222.

In an alternative configuration of wireless transmitter section 216, one or both of input filters 224, 226 may be omitted. In accordance with this alternative configuration, (i) an output of power amplifier 220 may be connected to an output filter (not shown) that passes the first carrier but filters out other carriers, such as the second carrier, and (ii) an output of power amplifier 222 may be connected to an output filter (not shown) that passes the second carrier but filters out other carriers, such as the first carrier.

In yet another alternative configuration of wireless transmitter section 216, power amplifier 220 may comprise a multicarrier power amplifier (MPA) that is configured to emit a plurality of carriers for carrying pilot beacons; however, only one carrier (hereinafter the "active carrier") of the plurality of carriers is emitted from the MPA at any time. In accordance with this alternative configuration, wireless transmitter section 216 includes power amplifier 222 and the plurality of carriers emitted by the MPA does not include the carrier emitted by power amplifier 222. Further, in accordance with this alternative configuration, base station 102 may select which carrier of the plurality of carriers is the active carrier. The base station's selection of the active carrier may, for example, be based on any of a variety of frequency hopping schemes known to a person having ordinary skill in the art or based on some other scheme.

In still yet another alternative configuration of wireless transmitter section 216, power amplifier 220 may comprise a multicarrier power amplifier that can be selectively configured to either (i) emit the first carrier but not the second carrier, (ii) emit the second carrier but not the first carrier, or (iii) emit the first carrier and the second carrier. In accordance with this alternative configuration, power amplifier 222 may be omitted.

In the embodiments in which a carrier is excluded or substantially excluded, if the base station emits any signal (e.g., a leakage signal) that has a frequency similar to the carrier that is excluded or substantially excluded, that signal is considered to be trivial and irrelevant. The leakage signal referred to herein may be emitted by a power amplifier, a processor, or some other element of the base station.

Communication interface 206 is operable to carry out communications with core network 108 and RAN 110 via backhaul network interface 212, PDNI 104, and packet data network 106. As an example, backhaul network interface 212 may packetize data contained in reverse-link communications received from one or more mobile stations so as to produce Ethernet packets, and then provide the Ethernet packets to PDNI 104, which may in turn transmit the Ethernet packets to packet data network 106 for transmission to core network 108 and/or RAN 110.

Backhaul network interface 212 is not limited to transmitting reverse-link communications received from mobile stations. For example, backhaul network interface 212 may receive communications sent from core network 108 and/or RAN 110, such as a communication that indicates whether a given mobile station is authorized to be served by base station 102 and/or forward-link communications destined for one or more mobile stations that register with base station 102. Other examples of communications that may be carried out via backhaul network interface 212 are also possible.

User interface 208 may carry out any of a variety of functions for a user and/or base station 102. User interface 208 may comprise any of a variety of devices to carry out the various functions. For example, user interface 208 may comprise a display device to provide (i) an indication of whether base station 102 is operating in the first mode or the second mode, (ii) an indication of whether base station 102 is powered on or powered off, and/or (iii) some other indication. As another example, user interface 208 may include means for a user to enter data into data storage 204, such as data that indicates whether a given mobile station is authorized to be served by base station 102. The means for the user to enter the data may include (i) a keyboard, (ii) an interface to a cable, e.g., a Universal Serial Bus (USB) cable, that connects to a desktop PC executing an application for entering data into base station 102, (iii) an infrared receiver/transmitter, or (iv) some other means.

Data storage 204 may contain various types of data. For example, data storage 204 may contain a time threshold 232 that indicates an amount of time (e.g., a maximum amount of time) that base station 102 should operate in the second state if no mobile stations are registered as being authorized to be served by base stations 200.

As another example, data storage 204 may contain a variety of computer-readable program instructions 230. Program instructions 230 may include various groups of program instructions. A first group of program instructions may include instructions that cause base station 102 to operate in a first state, in which amplifier 220 is turned on and amplifier 222 is turned off, instead of in a second state, in which amplifiers 220, 222 are turned on. A second group of program instructions may include instructions that cause base station 102 to operate in the second state instead of the first state.

A third group of program instructions may include instructions that cause processor 202 to make a determination that base station 102 is receiving or has begun receiving a communication from a given mobile station. Execution of the third group of program instructions may include processor 202 monitoring communications received at wireless receiver 214 and determining whether any of the received communications is/are from the given mobile station. Processor 202 may execute the third group of program instructions while base station 102 is operating in the first state and while base station 102 is operating in the second state.

A fourth group of program instructions may include instructions that cause processor 202 to make a determination that no mobile stations are registered as being authorized to be served by base station 102 (e.g., that a last registered mobile station has de-registered from the base station or that no mobile station registered with the base station within a threshold amount of time after the base station transitions to operate in the second state). Processor 202 preferably executes the fourth group of program instructions while base station 102 is operating in the second state.

A fifth group of program instructions may include instructions that cause processor 202 to (i) start a timer at base station 102 so as to track how much time has passed since transitioning base station 102 to operate in the second state, and (ii) compare the tracked time to time threshold 232 so as to determine whether the tracked time is greater than or equal to time threshold 232. Program instructions 230 may include instructions to determine whether any mobile stations are registered as being authorized to be served by base station 102, and these instructions may be executable upon processor 202 determining that the tracked time is greater than or equal to time threshold 232. If the tracked time is less than time threshold 232, the processor may continue to execute instructions to track how much time has passed since transitioning base station 102 to operate in the second state.

As yet another example, data storage 204 may contain authorization data that indicates a set of mobile stations that are authorized to be served by a particular base station, such as base station 102. Other examples of data that may be contained in data storage 204 are also possible.

Figure 3:
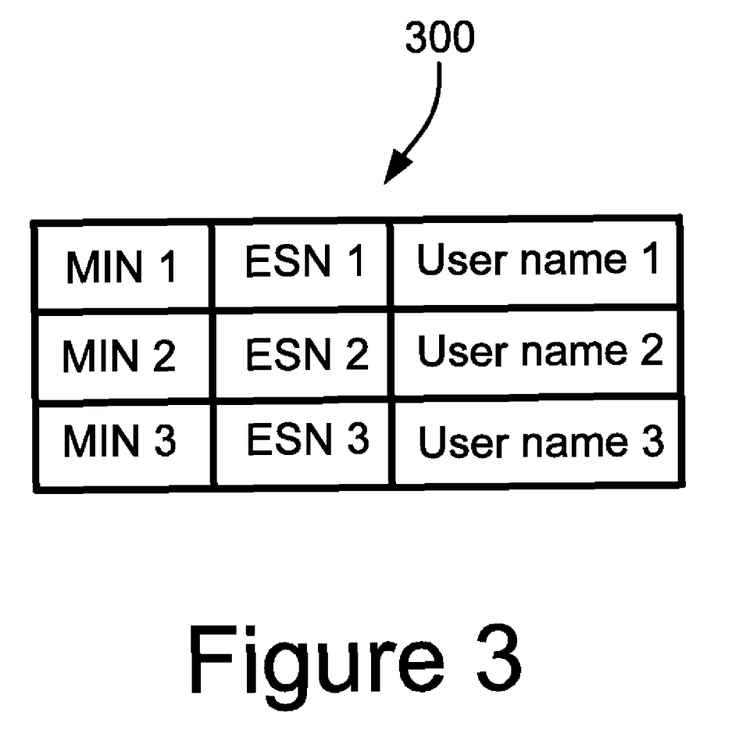
FIG. 3 is a table containing exemplary authorization data for determining whether a given mobile station is authorized to be served by a given base station.

FIG. 3 is a table depicting exemplary authorization data 300 that may be maintained in data storage, such as data storage 136 and/or data storage 204. Authorization data 300 indicates a set of mobile stations that are authorized to be served by a particular base station, such as base station 102. In this regard, authorization data 300 may indicate a set of mobile stations that are authorized to be served by a femtocell base station, a macro base station, or another type of base station.

Each row of authorization data 300 includes data that is associated with a respective mobile station depicted in FIG. 1. For example, the top row of the authorization data 300 includes a mobile identification number (MIN), an electronic serial number (ESN), and a user name that may be associated with mobile station 114. Similarly, the second row of the authorization data includes a MIN, an ESN, and a user name that may be associated with mobile station 116, and the bottom row of authorization data 300 includes a MIN, an ESN, and a user name that may be associated with mobile station 132. In accordance with this exemplary authorization data, mobile station 134 is not authorized to be served by base station 102. However, in an alternative embodiment, authorization data, which may include data for greater than or less than three mobile stations, may include data associated with mobile station 134. Other examples of data indicating which mobile station(s) is/are authorized to be served by a particular base station are also possible.

Authorization data 300 may be obtained in various ways and then stored in data storage. For example, authorization data 300 may be entered via user interface 208 and then passed to data storage 204 via connection mechanism 210. As another example, authorization data 300 may be received from the core network via backhaul network interface 212 and then passed to data storage 204 via connection mechanism 210. As yet another example, authorization data 300 may be entered via O & M section 138 and then passed to data storage 136 from O & M section 138. Other examples of obtaining and then storing authorization data 300 are also possible.

3. Exemplary Operation a. Multiple Power Amplifiers

Figure 4:
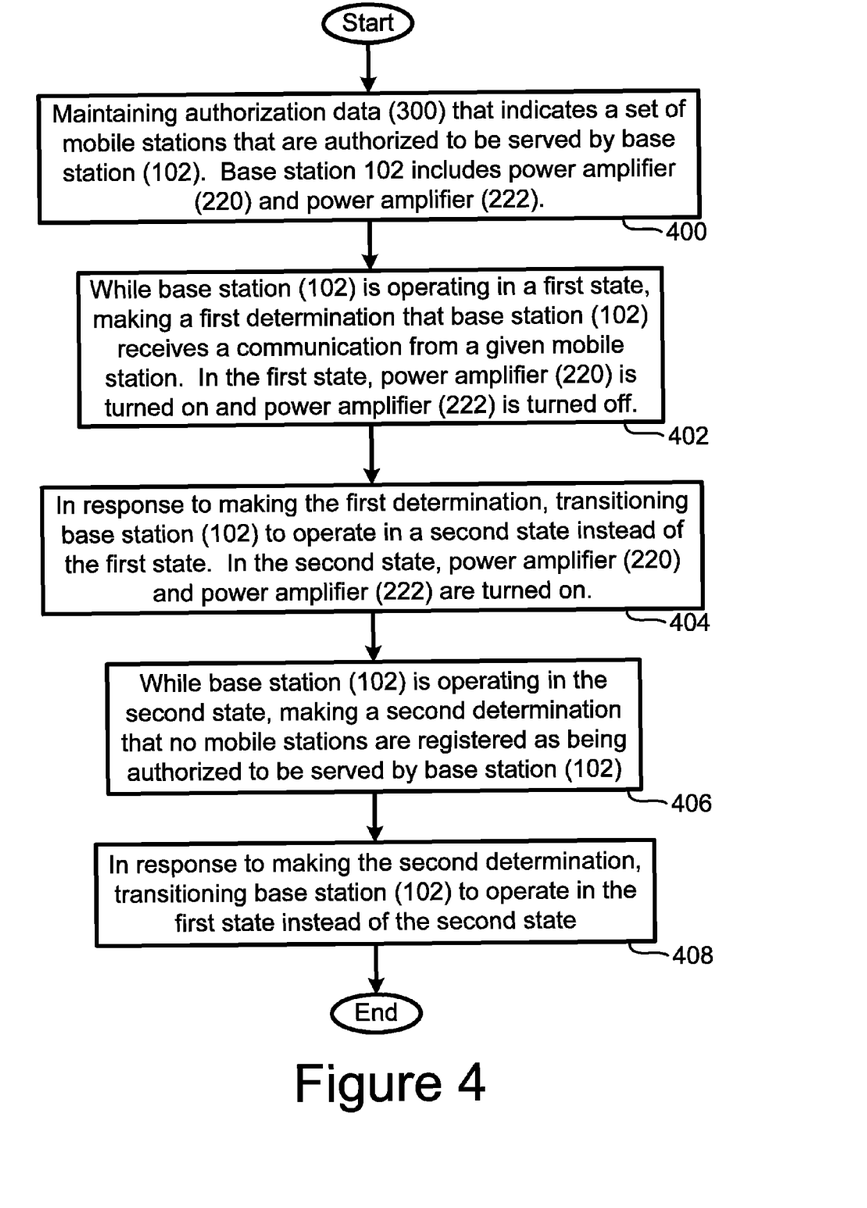
FIG. 4 is a flow chart depicting a set of functions that may be carried out in accordance with an exemplary method.

FIG. 4 is a flow chart illustrating a set of functions of an exemplary method that may be carried out with system 100. In this exemplary method, base station 102 includes (i) power amplifier 220 for emitting the first carrier to carry pilot beacons, and (ii) power amplifier 222 for emitting the second carrier to carry forward-link communications (e.g., voice communications and/or SMS message communications).

As illustrated in FIG. 4, block 400 includes maintaining authorization data 300 that indicates a set of mobile stations that are authorized to be served by base station 102. Maintaining authorization data 300 may be carried out at data storage 204, at data storage 136, or at other data storage.

Next, block 402 includes, while base station 102 is operating in a first state, making a first determination that base station 102 receives a communication from a given mobile station. Base station 102, in particular processor 202, may make the first determination. In the first state, power amplifier 220 is turned on and power amplifier 222 is turned off. The received communication, for example, may include an access probe sent via a reverse-link access channel. In this regard, mobile station 114 may send the access probe via a reverse-link access channel of air interface 140 in response to receiving a pilot beacon carried by a carrier emitted from power amplifier 220. Other examples of the received communication are also possible.

Next, block 404 includes, in response to making the first determination, transitioning base station 102 to operate in a second state instead of the first state. While base station 102 transitions to the second state, base station 102 may continue to operate in the first state. Upon transitioning to the second state, power amplifier 220 and power amplifier 222 are turned on, power amplifier 220 may emit the first carrier and power amplifier 222 may emit the second carrier, and user interface 208 may provide notification that base station 102 is operating in the second state.

Additionally, upon transitioning base station 102 to operate in the second state, base station 102 may start a timer to track how much time has passed since transitioning to the second state. For purposes of this description, this time will be referred to herein as the "tracked time." As an example, starting the timer may include executing program instructions that cause data storage 204 to set a first given data value in data storage 204 to a value of zero and then executing program instructions that cause data storage 204 to periodically increase the first given data value so that the data value represents the tracked time. As another example, starting the timer may include executing program instructions that cause data storage 204 to set a second given data value in data storage 204 to a value that represents the time of day (and possibly the date) when base station 102 transitions to operate in the second state. Thereafter, base station 102 may determine the tracked time by comparing the current time of day (and possibly the date) to the time of day (and possibly the date) represented by the second given data value. Other examples of starting the timer are also possible.

After transitioning base station 102 to operate in the second state, base station 102 may determine whether the given mobile station is authorized to be served by base station 102. For purposes of this description, this determination will be referred to herein as the "authorization determination." In accordance with an exemplary embodiment, base station 102 may make the authorization determination after comparing the tracked time to time threshold 232 so as to determine whether the tracked time is greater than or equal to time threshold 232. If the tracked time is greater than or equal to time threshold 232, base station 102 may make the authorization determination. Otherwise, if the tracked time is less than time threshold 232, base station 102 may continue tracking how much time has passed since transitioning base station 102 to operate in the second state. If the tracked time is greater than or equal to time threshold 232, base station 102 could continue tracking how much time has passed since transitioning base station 102 to operate in the second state.

In one respect, base station 102 may make the authorization determination by comparing data received from the given mobile station to authorization data 300 maintained at data storage 204. For example, if the communication sent from the given mobile station includes a MIN associated with the given mobile station, base station 102 may compare the received MIN to authorization data 300 so as to determine whether the received MIN matches a MIN of authorization data 300. If the received MIN matches a MIN of authorization data 300, then the given mobile station is authorized to be served by base station 102. If the received MIN does not match a MIN of the authorization data, then the given mobile station is not authorized to be served by base station 102.

In another respect, base station 102 may make the authorization determination by (i) communicating via packet data network 106 to core network 108 a request message to determine whether the given mobile station is authorized to be served by base station 102, and (ii) receiving from core network 108 via packet data network 106 a request response message including data that indicates whether the given mobile station is authorized to be served by base station 102. In this regard, core network 108 may include a server (not shown) that searches authorization data stored at data storage 136 so as to make the determination and produce the request response message. Backhaul network interface 212 may send the request message to PDNI 104 so as to communicate the request message to packet data network 106, for subsequent transmission to core network 108. PDNI 104 may provide the request response message to backhaul network interface 212, which then provides the request response message to processor 202 for use in making the authorization determination.

Base station 102 may condition registration of the given mobile station on the authorization determination. For example, base station 102 may register the given mobile station if the authorization determination is that the given mobile station is authorized to be served by base station 102. However, base station 102 may not register the given mobile station if the authorization determination is that the given mobile station is not authorized to be served by base station 102. If the base station 102 registers the given mobile station, the processor 202 may execute program instructions to prevent the base station from entering the first state while the given mobile station remains registered with the base station.

After registering the given mobile station, base station 102 may transmit forward-link communications via the second carrier emitted by power amplifier 222. The forward-link communications may be communications for a communication session established between (i) the given mobile station and (ii) a communication device that is remote from both base station 102 and the given mobile station. The communication session may be initiated after base station 102 transitions to operate in the second state. Alternatively, the communication session may be initiated prior to base station 102 transitioning to operate in the second state or while base station 102 is transitioning to operate in the second state. This latter communication session may be a session that is handed off to base station 102 from another base station (e.g., base station 130).

While base station 102 is operating in the second state, one or more other mobile stations authorized to be served by base station 102 may register with base station 102, and thereafter, base station 102 may de-register the given mobile station and/or any of the one or more other mobile stations. As an example, base station 102 may de-register a mobile station when that mobile station is handed off to another base station (e.g., base station 130). As another example, base station 102 may de-register a mobile station if the mobile station does not respond within a predefined period of time (e.g., 1 second) to a mobile-directed message sent to that mobile station from base station 102.

Next, block 406 includes, while base station 102 is operating in the second state, making a second determination that no mobile stations are registered as being authorized to be served by base station 102. Base station 102 may make the second determination in response to comparing the tracked time to time threshold 232 and determining that the tracked time is greater than or equal to time threshold 232.

As an example, base station 102 may make the second determination by determining that the given mobile station that sent the communication (in block 402) is not authorized to be served by the mobile station and determining that no other mobile station has registered with base station 102 after base station 102 transitioned to operate in the second state.

As another example, base station 102 may make the second determination by determining that base station 102 has de-registered each mobile station that registered with base station 102 after the base station transitioned to operate in the second state. Other examples of making the second determination are also possible.

Next, block 408 includes, in response to making the second determination, transitioning base station 102 to operate in the first state instead of the second state. While base station 102 transitions to the first state, base station 102 may continue to operate in the second state. After base station 102 transitions to operate in the first state, base station 102 may (i) provide via user interface 208 notification that base station 102 is operating in the first state, and/or (ii) repeat making the first determination that another communication is received from the given mobile station or from another mobile station.

b. Multicarrier Power Amplifier

Figure 5:
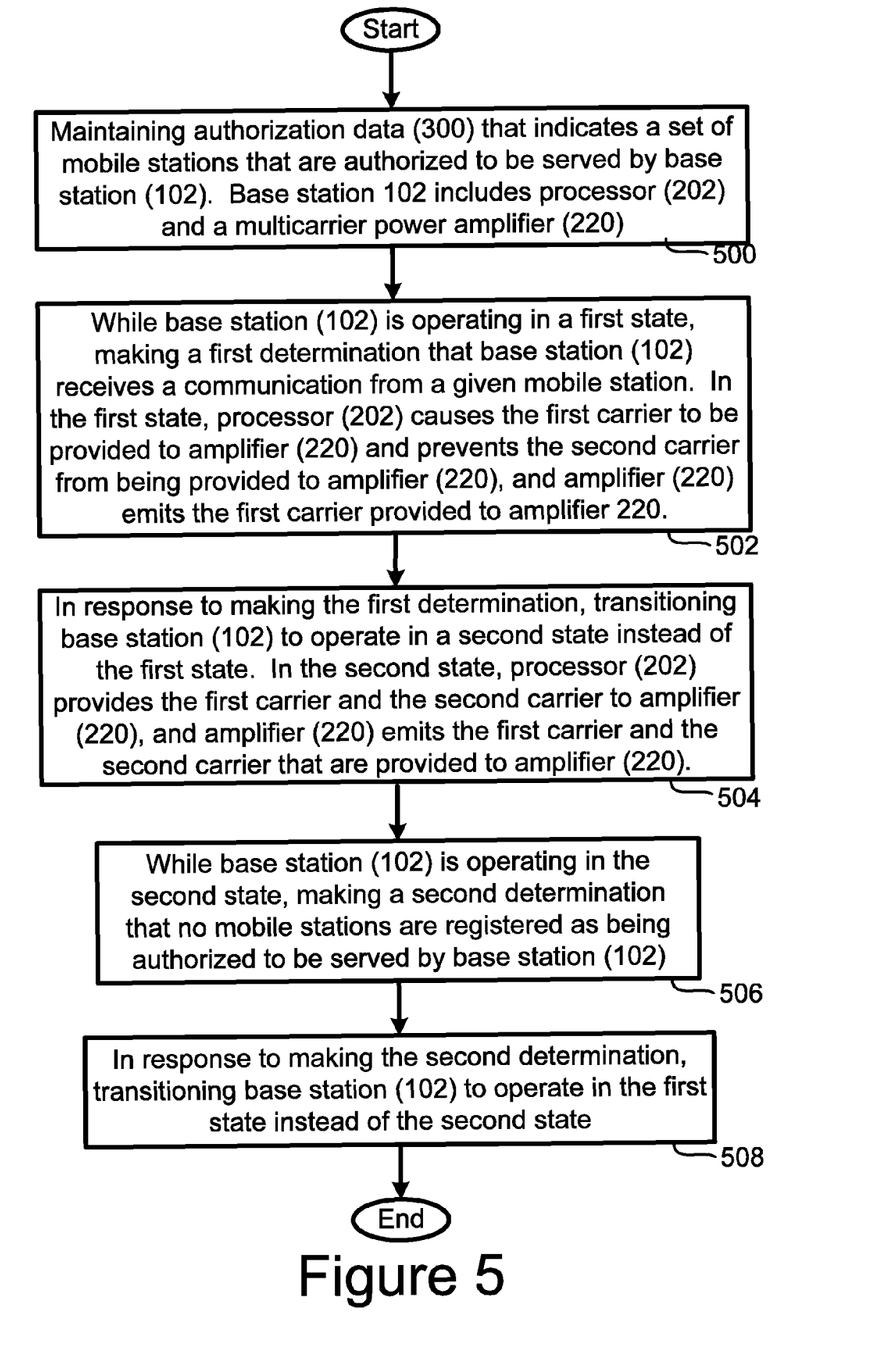
FIG. 5 is a flow chart depicting another set of functions that may be carried out in accordance with an exemplary method.

FIG. 5 is a flow chart illustrating a set of functions that may be carried out in accordance with an exemplary embodiment in which the power amplifier 220 of base station 102 is arranged as a multicarrier power amplifier (MPA). In accordance with this exemplary embodiment, processor 202 may execute program instructions 230 to carry out one or more of the functions illustrated in FIG. 5.

Block 500 includes maintaining authorization data 300 that indicates a set of mobile stations that are authorized to be served by a base station 102. Base station 102 includes processor 202 and power amplifier 220 (arranged as an MPA), and may exclude power amplifier 222. Processor 202 is operable to cause a first carrier for carrying a pilot beacon or the first carrier and a second carrier for carrying forward-link communication signals to be provided to the MPA. The MPA is operable to emit the first carrier and/or the second carrier. Maintaining authorization data 300 may be carried out at data storage 204, at data storage 136, or at other data storage.

Next, block 502 includes, while base station 102 is operating in a first state, making a first determination that base station 102 receives a communication from a given mobile station. The first determination may be made at base station 102. In the first state, processor 202 causes the first carrier to be provided to the MPA and prevents the second carrier from being provided to the MPA, and the MPA amplifies than emits the first carrier. In this first state, the MPA does not emit the second carrier. Similar to block 402, the received communication may include an access probe sent via a reverse-link access channel, or some other communication.

Processor 202 may operate in various ways to cause the first carrier and/or the second carrier to be provided to the MPA. For example, processor 202 may execute program instructions 230 that cause processor 202 to produce the first carrier and/or the second carrier and then cause processor 202 to provide the first carrier and/or the second carrier to the MPA.

As another example, base station 102 may include a carrier generator that is remote from processor 202 and that can generate the first carrier and/or the second carrier in response to receiving signals from processor 202, and thereafter provide the generated carrier(s) to the MPA. Processor 202 may execute program instructions that cause processor 202 to send to the carrier generator a first signal that indicates the carrier generator should generate the first carrier, but not the second carrier, or a signal that indicates the carrier generator should generate the first carrier and the second carrier. In this regard, processor 202 may send the first signal to the carrier generator when the base station is transitioning to the first state, and processor 202 may send the second signal to the carrier generator when the base station is transitioning to the second state. Other examples of processor 202 causing the first carrier and/or the second carrier to be provided to the MPA are also possible.

Next, block 504 includes, in response to making the first determination, transitioning base station 102 to operate in a second state instead of the first state. While base station 102 transitions to the second state, base station 102 may continue to operate in the first state. Upon transitioning to the second state, processor 202 may cause the first carrier and the second carrier to be provided to the MPA, and the MPA may amplify and then emit the first carrier and the second carrier that are provided to the MPA.

Providing the first carrier and the second carrier to the MPA may be conditioned on whether base station 102 has data (e.g., a pilot beacon, a page, VoIP data packets, or other data) to send via the first carrier and the second carrier, respectively. As an example, the first carrier may be provided to the MPA continuously so that the MPA can continuously emit the first carrier to carry pilot beacons identifying base station 102. As another example, the second carrier may be provided to the MPA when base station 102 has data for sending over a pilot, page, sync or traffic channel. Alternatively, the first carrier and the second carrier may both be continuously provided to the MPA.

Upon transitioning base station 102 to operate in the second state, base station 102 may start the timer to track the tracked time (i.e., how much time has passed since transitioning base station 102 to operate in the second state). As an example, starting the timer may include executing program instructions that cause data storage 204 to set a first given data value in data storage 204 to a value of zero and then executing program instructions that cause data storage 204 to periodically increase the first given data value so that the data value represents the tracked time. As another example, starting the timer may include executing program instructions that cause data storage 204 to set a second given data value in data storage 204 to a value that represents the time of day (and possibly the date) when base station 102 transitions to operate in the second state. Thereafter, base station 102 may determine the tracked time by comparing the current time of day (and possibly the date) to the time of day (and possibly the date) represented by the second given data value. Other examples of starting the timer are also possible.

Additionally, after transitioning base station 102 to operate in the second state, base station 102 may make the authorization determination (i.e., the determination of whether the given mobile station is authorized to be served by base station 102). In accordance with an exemplary embodiment, base station 102 may make the authorization determination after comparing the tracked time to time threshold 232 so as to determine whether the tracked time is greater than or equal to time threshold 232. If the tracked time is greater than or equal to time threshold 232, base station 102 may make the authorization determination. Otherwise, if the tracked time is less than time threshold 232, base station 102 may continue tracking how much time has passed since transitioning base station 102 to operate in the second state. If the tracked time is greater than or equal to time threshold 232, base station 102 could continue tracking how much time has passed since transitioning base station 102 to operate in the second state.

In one respect, base station 102 may make the authorization determination by comparing data received from the given mobile station to authorization data 300 maintained at data storage 204. For example, if the communication sent from the given mobile station includes a MIN associated with the given mobile station, base station 102 may compare the received MIN to authorization data 300 so as to determine whether the received MIN matches a MIN of authorization data 300. If the received MIN matches a MIN of authorization data 300, then the given mobile station is authorized to be served by base station 102. If the received MIN does not match a MIN of the authorization data, then the given mobile station is not authorized to be served by base station 102.

In another respect, base station 102 may make the authorization determination by (i) communicating via packet data network 106 to core network 108 a request message to determine whether the given mobile station is authorized to be served by base station 102, and (ii) receiving from core network 108 via packet data network 106 a request response message including data that indicates whether the given mobile station is authorized to be served by base station 102. In this regard, core network 108 may include a server (not shown) that searches authorization data stored at data storage 136 so as to make the determination and produce the request response message. Backhaul network interface 212 may send the request message to PDNI 104 so as to communicate the request message to packet data network 106, for subsequent transmission to core network 108. PDNI 104 may provide the request response message to backhaul network interface 212, which then provides the request response message to processor 202 for use in making the authorization determination.

Base station 102 may condition registration of the given mobile station on the authorization determination. For example, base station 102 may register the given mobile station if the authorization determination is that the given mobile station is authorized to be served by base station 102. However, base station 102 may not register the given mobile station if the authorization determination is that the given mobile station is not authorized to be served by base station 102. If the base station 102 registers the given mobile station, the processor 202 may execute program instructions to prevent the base station from entering the first state while the given mobile station remains registered with the base station.

After registering the given mobile station, base station 102 may transmit forward-link communications via the second carrier emitted by power amplifier 222. The forward-link communications may be communications for a communication session established between (i) the given mobile station and (ii) a communication device that is remote from both base station 102 and the given mobile station. The communication session may be initiated after base station 102 transitions to operate in the second state. Alternatively, the communication session may be initiated prior to base station 102 transitioning to operate in the second state or while base station 102 is transitioning to operate in the second state. This latter communication session may be a session that is handed off to base station 102 from another base station (e.g., base station 130).

While base station 102 is operating in the second state, one or more other mobile stations authorized to be served by base station 102 may register with base station 102, and thereafter, base station 102 may de-register the given mobile station and/or any of the one or more other mobile stations. As an example, base station 102 may de-register a mobile station when that mobile station is handed off to another base station (e.g., base station 130). As another example, base station 102 may de-register a mobile station if the mobile station does not respond within a predefined period of time (e.g., 1 second) to a mobile-directed message sent to that mobile station from base station 102.

Next, block 506 includes, while base station 102 is operating in the second state, making a second determination that no mobile stations are registered as being authorized to be served by base station 102. Base station 102 may make the second determination in response to comparing the tracked time to time threshold 232 and determining that the tracked time is greater than or equal to time threshold 232. The description of block 406 provides examples of base station 102 making the second determination.

Next, block 508 includes, in response to making the second determination, transitioning base station 102 to operate in the first state instead of the second state. While the base station transitions to the first state, base station 102 may continue to operate in the second state. After base station 102 transitions to operate in the first state, base station 102 may (i) provide via user interface 208 notification that base station 102 is operating in the first state, and/or (ii) repeat making the first determination that the base station receives a communication from the given mobile station or from another mobile station.

4. Conclusion

Exemplary embodiments arranged as a system or method have been described above. Those skilled in the art will understand, however, that changes and modifications may be made to the embodiments described without departing from the true scope and spirit of the present invention, which is defined by the claims. Additionally a computer-readable medium may contain program instructions, executable by a processor, that cause the functions described herein to be carried out, for example, by the processor 202 and/or by another element of a base station.

Finally, the word "exemplary" is used herein to mean "serving as an example, instance, or illustration." Any embodiment described herein as "exemplary" is not necessarily to be construed as preferred or advantageous over other embodiments.

I claim:

1. A method carried out by a base station including a first power amplifier that emits a first carrier for carrying a pilot beacon and a second power amplifier that emits a second carrier for carrying forward-link communications, wherein the base station is operable in a first state in which the first power amplifier is turned on and the second power amplifier is turned off, and wherein the base station is operable in a second state in which the first power amplifier is turned on and the second power amplifier is turned on, the method comprising:
    at the base station, while the base station is operating in the first state, making a first determination that the base station receives a communication from a given mobile station, and in response to making the first determination, transitioning the base station to operate in the second state instead of the first state; and
    at the base station, while the base station is operating in the second state, making a second determination that no mobile stations are registered as being authorized to be served by the base station, and in response to making the second determination, transitioning the base station to operate in the first state instead of the second state.

2. The method of claim 1, further comprising:
    after transitioning the base station to operate in the second state and prior to transitioning the base station to operate in the first state, registering the given mobile station at the base station as a mobile station authorized to be served by the base station; and
    at the base station, transmitting forward-link communications via the second carrier for a communication session established between (i) the given mobile station, and (ii) a device that is remote from the base station and the given mobile station.

3. The method of claim 2, wherein the communication session is initiated after transitioning the base station to operate in the second state.

4. The method of claim 2,
    wherein the communication session is initiated prior to transitioning the base station to operate in the second state, and
    wherein the communication session is handed off to the base station from another base station.

5. The method of claim 1, further comprising:
    after transitioning the base station to operate in the second state and prior to the base station making the second determination,
    (i) starting a timer at the base station to track how much time has passed since transitioning the base station to operate in the second state, and
    (ii) at the base station, comparing the tracked time to a threshold amount of time so as to determine whether the tracked time is greater than or equal to the threshold amount of time, and if the tracked time is greater than or equal to the threshold amount of time, determining whether any mobile stations are registered as being authorized to be served by the base station.

6. The method of claim 1, wherein the communication received from the given mobile station comprises an access probe sent via a reverse-link access channel.

7. The method of claim 1,
    wherein the first carrier carries data within a channel selected from the group consisting of a paging channel, a sync channel, and a pilot channel, and
    wherein the transmitted data within the pilot channel comprises the pilot beacon.

8. The method of claim 1, wherein the pilot beacon comprises a stream of zeros that is spread by a Walsh code of 0 and then multiplied by a pseudorandom (PN) offset to identify the base station.

9. The method of claim 1, further comprising:
    at the base station, after receiving the communication from the given mobile station, making a determination of whether the given mobile station is authorized to be served by the base station; and
    conditioning registration of the given mobile station on the determination of whether the given mobile station is authorized to be served by the base station.

10. The method of claim 9,
    wherein the base station interfaces to a packet data network via a packet data network interface including a router and a modem, and
    wherein making the determination of whether the given mobile station is authorized to be served by the base station includes the base station: (i) communicating via the packet data network to a core network of a wireless service provider a request to determine whether the given mobile station is authorized to be served by the base station, and (ii) receiving from the core network via the packet data network, a request response that indicates whether the given mobile station is authorized to be served by the base station.

11. The method of claim 9,
wherein making the determination of whether the given mobile station is authorized to be served by the base station is carried out while the base station is operating in the first state or while the base station is operating in the second state, and
wherein the base station operates in the first state while transitioning the base station to operate in the second state instead of the first state.

12. The method of claim 9, further comprising:
at the base station, maintaining data that indicates a set of mobile stations that are authorized to be served by the base station,
wherein making the determination of whether the given mobile station is authorized to be served by the base station includes comparing data received from the given mobile station to the data maintained at the base station so as to determine whether the set of mobile stations authorized to be served by the base station includes the given mobile station.

13. The method of claim 1, further comprising:
while the base station is operating in the first state, transmitting one or more other pilot beacons from the base station,
wherein each of the one or more other pilot beacons is carried via a carrier selected by the base station from a plurality of carriers that can be emitted by the base station,
wherein selection of the carrier is based on a pseudorandom sequence,
wherein the plurality of carriers includes the first carrier and excludes the second carrier,
wherein the first power amplifier emits each carrier of the plurality of carriers, and
wherein the given mobile station receives at least one of the pilot beacons transmitted from the base station and responsively transmits the communication to the base station via a reverse-link carrier identified by the at least one pilot beacon received at the mobile station.

14. A system comprising:
a first power amplifier that emits a first carrier for carrying a pilot beacon;
a second power amplifier that emits a second carrier for carrying forward-link communications, wherein the system is operable in a first state in which the first power amplifier is turned on and the second power amplifier is turned off, wherein the system is operable in a second state in which the first power amplifier is turned on and the second power amplifier is turned on, and wherein the first power amplifier does not emit the second carrier and the second power amplifier does not emit the first carrier;
a communication interface to carry out communications with one or more mobile stations;
a processor; and
data storage that contains computer-readable program instructions executable by the processor (i) while the system operates in the first state, to make a first determination that the communication interface receives a communication from a given mobile station, (ii) in response to the first determination being made, to transition the system to operate in the second state instead of the first state, (iii) while the base station operates in the second state, to make a second determination that no mobile stations are registered as being authorized to be served by the system, and (iv) in response to the second determination being made, to transition the system to operate in the first state instead of the second state.

15. The system of claim 14, further comprising:
a backhaul network interface that interfaces to a packet data network interface and, in turn, to a packet data network and a core network that is operated by a wireless service provider,
wherein the backhaul network interface transmits to the packet data network interface a request to determine whether the given mobile station is authorized to be served by the system, and (ii) receives from the packet data network interface a request response sent from the core network via the packet data network,
wherein the request to determine whether the given mobile station is authorized to be served by the system is destined for the core network,
wherein the request response indicates whether the given mobile station is authorized to be served by the system, and
wherein the system makes the second determination that no mobile stations are registered as being authorized to be served by the system, at least in part, in response to the received request response.

16. The system of claim 14,
wherein the data storage further contains data that indicates a set of mobile stations that are authorized to be served by the system, and
wherein the computer-readable program instructions include instruction executable by the processor to compare data received from the given mobile station to the data contained at the data storage so as to determine whether the set of mobile stations authorized to be served by the system includes the given mobile station.

17. The system of claim 14, further comprising:
a first filter connected to the first power amplifier, and
a second filter connected to the second power amplifier,
wherein the first filter filters out the second carrier from a first input signal that includes the first carrier and the second carrier so as to produce a first filtered input signal that includes the first carrier and excludes the second carrier,
wherein the first power amplifier receives the first filtered input signal, and amplifies the first filtered input signal so as to produce the first carrier emitted from the first power amplifier,
wherein the second filter filters out the first carrier from a second input signal that includes the first carrier and the second carrier so as to produce a second filtered input signal that includes the second carrier and excludes the first carrier, and
wherein the second power amplifier receives the second filtered input signal, and amplifies the second filtered input signal so as to produce the second carrier emitted from the second power amplifier.

18. A base station comprising:
a first power amplifier that emits a first carrier for carrying a pilot beacon;
a second power amplifier that emits a second carrier for carrying forward-link communications, wherein the base station is operable in a first state in which the first power amplifier is turned on and the second power amplifier is turned off, wherein the base station is operable in a second state in which the first power amplifier is turned on and the second power amplifier is turned on, and wherein the first power amplifier does not emit the second carrier and the second power amplifier does not emit the first carrier;
a processor; and
data storage that contains computer-readable program instructions executable by the processor (i) while the base station operates in the first state, to make a first determination that the base station receives a communication from a given mobile station, (ii) in response to the first determination being made, to transition the base station to operate in the second state instead of the first state, (iii) while the base station operates in the second state, to make a second determination that no mobile stations are registered as being authorized to be served by the base station, and (iv) in response to the second determination being made, to transition the base station to operate in the first state instead of the second state.

19. The base station of claim 18, wherein the base station is arranged as a femtocell base station.

20. The base station of claim 18, further comprising:
a backhaul network interface that interfaces to a packet data network interface and, in turn, to a packet data network and a core network that is operated by a wireless service provider,
wherein the backhaul network interface transmits to the packet data network interface a request to determine whether the given mobile station is authorized to be served by the base station, and (ii) receives from the packet data network interface a request response sent from the core network via the packet data network,
wherein the request to determine whether the given mobile station is authorized to be served by the base station is destined for the core network,
wherein the request response indicates whether the given mobile station is authorized to be served by the base station, and
wherein the base station makes the second determination that no mobile stations are registered as being authorized to be served by the base station, at least in part, in response to the received request response.

21. A method carried out by a base station including a processor and a multicarrier power amplifier, wherein the processor is operable to cause a first carrier for carrying a pilot beacon or the first carrier and a second carrier for carrying forward-link communications to be provided to the multicarrier power amplifier, wherein the multicarrier power amplifier is operable to emit the first carrier and/or the second carrier, wherein the base station is operable in a first state in which the processor provides to the multicarrier power amplifier the first carrier but not the second carrier, and the multicarrier power amplifier emits the first carrier provided by the processor but does not emit the second carrier, and wherein the base station is operable in a second state in which the processor provides to the multicarrier power amplifier the first carrier and the second carrier, and the multicarrier power amplifier emits the first carrier and the second carrier that are provided by the processor, the method comprising:
at the base station, while the base station is operating in the first state, making a first determination that the base station receives a communication from a given mobile station, and in response to making the first determination, transitioning the base station to operate in the second state instead of the first state; and
at the base station, while the base station is operating in the second state, making a second determination that no mobile stations are registered as being authorized to be served by the base station, and in response to making the second determination, transitioning the base station to operate in the first state instead of the second state.

\* \* \* \* \*